US012651247B2

(12) United States Patent
Saxena et al.

(10) Patent No.: US 12,651,247 B2
(45) Date of Patent: Jun. 9, 2026

(54) HARDWARE WALLET AND METHOD TO SECURELY SIGN A TRANSACTION WITH A HARDWARE WALLET

(71) Applicant: Sandisk Technologies, Inc., Milpitas, CA (US)

(72) Inventors: Vishwas Saxena, Bengaluru (IN); Deepankar Kansal, Bathinda (IN); Rashi Gupta, Rampur (IN)

(73) Assignee: Sandisk Technologies, Inc., Milpitas, CA (US)

( * ) Notice: Subject to any disclaimer, the term of this patent is extended or adjusted under 35 U.S.C. 154(b) by 91 days.

(21) Appl. No.: 18/747,354

(22) Filed: Jun. 18, 2024

(65) Prior Publication Data

US 2025/0384430 A1     Dec. 18, 2025

(51) Int. Cl.
*G06Q 20/36* (2012.01)
*H04L 9/14* (2006.01)
*H04L 9/32* (2006.01)

(52) U.S. Cl.
CPC ........... *G06Q 20/3674* (2013.01); *H04L 9/14* (2013.01); *H04L 9/3242* (2013.01)

(58) Field of Classification Search
CPC ..... H04L 9/50; H04L 9/3247; G06Q 20/3829; G06Q 2220/00; G06F 21/602; G06F 21/64
See application file for complete search history.

(56) References Cited

U.S. PATENT DOCUMENTS

| | | | |
|---|---|---|---|
| 10,102,510 B2 | 10/2018 | Yau et al. | |
| 2016/0055480 A1* | 2/2016 | Shah .................... | G06Q 20/356 |
| | | | 705/21 |
| 2019/0325408 A1* | 10/2019 | Goroff .............. | G06Q 20/3825 |
| 2021/0058233 A1* | 2/2021 | Lee ........................ | H04L 9/3247 |
| 2022/0094537 A1* | 3/2022 | Shimada .............. | H04L 9/3247 |
| 2023/0252456 A1* | 8/2023 | Rapowitz ............. | H04L 9/0894 |
| | | | 705/71 |
| 2023/0396456 A1* | 12/2023 | Anderson ............ | H04L 9/3255 |
| 2024/0193584 A1* | 6/2024 | Gagne-Keats ..... | G06Q 20/3672 |
| 2024/0235840 A1* | 7/2024 | Osborn ..................... | H04L 9/50 |
| 2024/0281796 A1* | 8/2024 | Finlow-Bates ...... | G06Q 20/405 |
| 2024/0372732 A1* | 11/2024 | Pettit .................... | H04L 9/3242 |

FOREIGN PATENT DOCUMENTS

EP            3474209 A1     4/2019

* cited by examiner

*Primary Examiner* — Patrick McAtee
*Assistant Examiner* — Sima Asgari
(74) *Attorney, Agent, or Firm* — Patent Law Works LLP

(57) ABSTRACT

A method and hardware wallet to securely signing a transaction. This includes the hardware wallet receiving, from a host application of a host device, an unsigned transaction and a coin seed associated with a cryptocurrency coin of the unsigned transaction. The hardware wallet generates a private key based on: a root seed stored in the storage medium of the hardware wallet; and the received coin seed. The hardware wallet cryptographically signs the unsigned transaction with the generated private key to generate a signed transaction and sends the signed transaction to the host device.

20 Claims, 7 Drawing Sheets

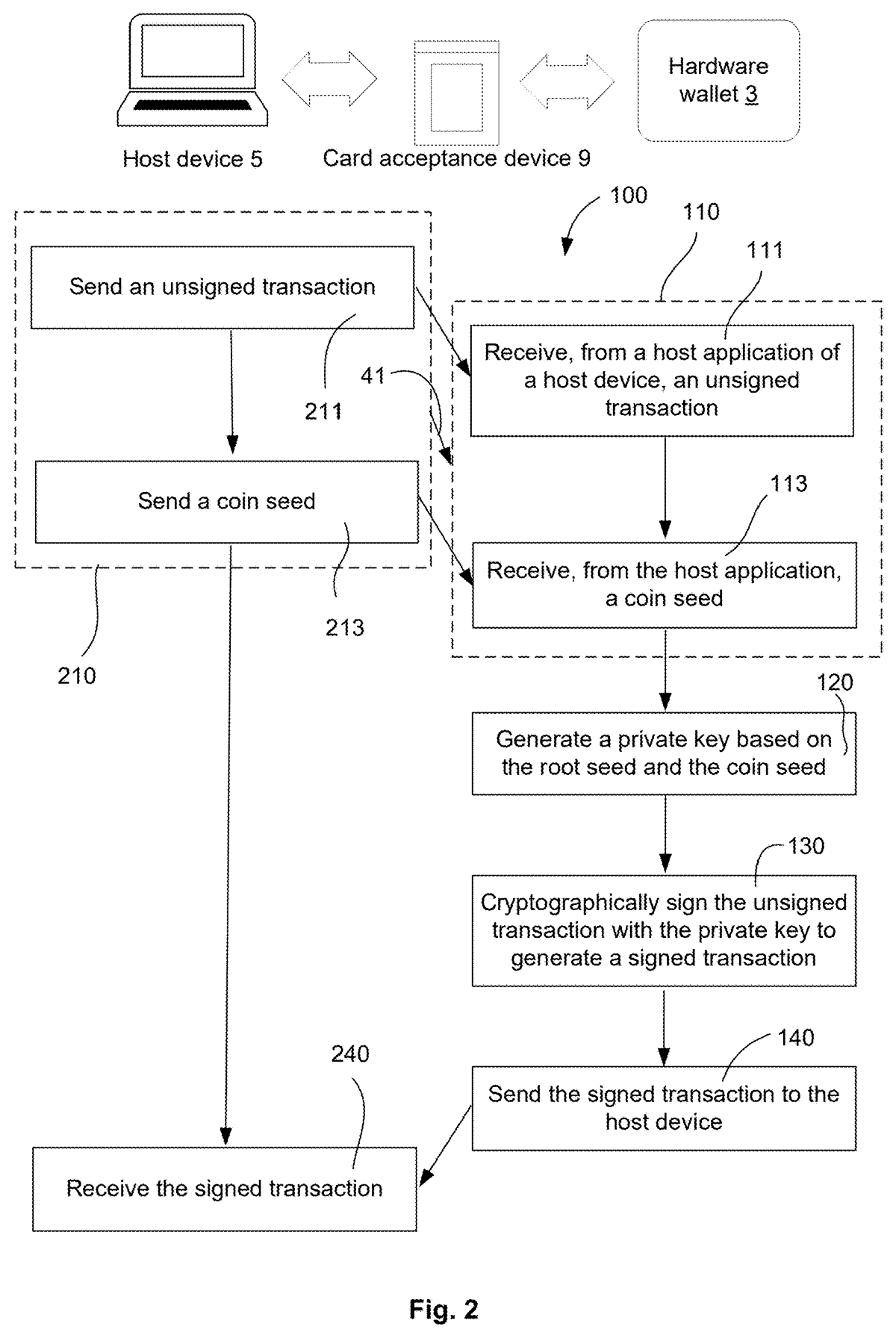

Host device 5     Card acceptance device 9     Hardware wallet 3

Send an unsigned transaction

Send a coin seed

Receive, from a host application of a host device, an unsigned transaction

Receive, from the host application, a coin seed

Generate a private key based on the root seed and the coin seed

Cryptographically sign the unsigned transaction with the private key to generate a signed transaction Send the signed transaction to the host device Receive the signed transaction

Fig. 2

HARDWARE WALLET AND METHOD TO SECURELY SIGN A TRANSACTION WITH A HARDWARE WALLET

TECHNICAL FIELD

The present disclosure relates to a hardware wallet to enable transactions of cryptocurrency and other digital assets. In particular examples, the hardware wallet is in communication with a host device to cryptographically sign transactions.

BACKGROUND

Private and public key pairs are used for conducting cryptocurrency (also known and crypto or crypto coin) and other blockchain-based transactions of digital assets. This typically involves an owner of such digital assets having a respective private key (either directly, or indirectly through a proxy or device) to enable transactions by digitally signing transactions with the private key.

Developers of crypto-coin market have created substitute storage solutions like mobile wallets (stored on a mobile communication device), and hot wallets (that are online-based wallets). The private keys, in the above solutions are typically maintained online or maintained in software that is connected online, thus are open to theft and hacking.

A crypto hardware wallet is an alternative that is in the form of a portable device that can store private keys in an offline hardware device such that crucial private keys are secure with the user in possession of the hardware wallet. The hardware wallet may include a chip secure enclave to save or perform operations with the private keys. Thus the hardware wallet can be used with a computer, or computer system that is not secure without losing security of the private key(s).

SUMMARY

There is provided a method of securely signing a transaction at a hardware wallet, the method comprising: receiving, from a host application of a host device, an unsigned transaction; and receiving, from the host application, a coin seed associated with a cryptocurrency coin of the unsigned transaction. The method further includes generating, at the hardware wallet, a private key based on: a root seed stored in the storage medium of the hardware wallet; and the coin seed. The method further includes cryptographically signing the unsigned transaction with the private key to generate a signed transaction; and sending the signed transaction to the host device, wherein the private key has a corresponding public key in a cryptographic private-public key pair and the signed transaction is associated with a wallet address derived from the public key.

In some examples, the method further includes the step of generating the private key comprises hierarchical deterministic key generation based on a first cryptographic hash function applied to the coin seed appended, or prepended, with the root seed.

In further examples of the method, a cryptographic output of the first cryptographic hash function includes: a first portion to form the private key; and a second portion to form a chain key.

In some examples of the method, receiving the unsigned transaction and receiving the coin seed comprises receiving a request to sign the unsigned transaction wherein the request includes both the unsigned transaction and the coin seed, and wherein the step of generating the private key is in response to receiving the coin seed in the request.

In further examples of the method, the coin seed received in the request to sign the unsigned transaction is in hexadecimal format.

In some examples of the method, when in an initialization mode, the method further comprises: generating a mnemonic phrase comprising a plurality of mnemonic words; generating the root seed based on the mnemonic phrase; and storing the root seed in the storage medium.

In some examples of the method, the step of generating the root seed is based on a password based key derivation function applied to the plurality of mnemonic words in the mnemonic phrase.

In some examples of the method, when in a second initialization mode, the method further comprises: receiving, from the host device, a mnemonic phrase to generate the root seed; generating the root seed based on the mnemonic phrase; and storing the root seed in the storage medium.

In some examples of the method, receiving the unsigned transaction comprises receiving the unsigned transaction from a card acceptance device associated with the host device, and wherein sending the signed transaction comprises sending the signed transaction to the card acceptance device associated with the host device.

In some examples of the method, the hardware wallet comprises a Java Card enabled smart card operating a Java-based application to perform the method.

There is also provided a hardware wallet to securely sign a transaction comprising: a storage medium configured to store a root seed; and one or more processors. The one or more processors are configured, individually or in combination, to: receive, from a host application of a host device, an unsigned transaction; and receive, from the host application, a coin seed associated with a cryptocurrency coin of the unsigned transaction. The one or more processors are also configured, individually or in combination, to generate a private key based on: the root seed; and the coin seed. The one or more processors are further configured, individually or in combination, to cryptographically sign the unsigned transaction with the private key to generate a signed transaction; and send the signed transaction to the host device, wherein the private key has a corresponding public key in a cryptographic private-public key pair and the signed transaction is associated with a wallet address derived from the public key.

In some examples of the hardware wallet, the one or more processors are configured, individually or in combination, to generate the private key with hierarchical deterministic key generation based on a first cryptographic hash function applied to the coin seed appended, or prepended, with the root seed.

In some examples of the hardware wallet, the one or more processors are configured, individually or in combination, to generate a cryptographic output of the first cryptographic hash function that includes: a first portion to form the private key; and a second portion to form a chain key.

In some examples of the hardware wallet, the one or more processors are configured, individually or in combination, to receive a request to sign the unsigned transaction that includes both the unsigned transaction and the coin seed, and wherein in response to the request, the one or more processors are configured, individually or in combination, to generate the private key.

In some examples of the hardware wallet, in an initialization mode the one or more processors are configured, individually or in combination, to: generate a mnemonic phrase comprising a plurality of mnemonic words; generate the root seed based on the mnemonic phrase; and store the root seed in the storage medium.

In further examples of the hardware wallet, the one or more processors are configured, individually or in combination, to generate the root seed based on a password based key derivation function applied to the plurality of mnemonic words in the mnemonic phrase.

In some examples of the hardware wallet, in a second initialization mode the one or more processors are configured, individually or in combination, to: receive, from the host device, a mnemonic phrase to generate the root seed; generate the root seed based on the mnemonic phrase; and store the root seed in the storage medium.

In some examples, the hardware wallet further comprises: a communication interface configured to communicate with a card acceptance device associated with the host device, and wherein the one or more processors are configured, individually or in combination, to receive the unsigned transaction via the communication interface and the card acceptance device, and wherein the one or more processors are configured, individually or in combination, to send the signed transaction via the communication interface and the card acceptance device.

In some examples the hardware wallet comprises Java Card enabled smart card operating a Java-based application on the one or more processors.

There is also provided a data storage device to securely sign a transaction comprising: means for storing data to store a root seed; means for receiving, from a host application of a host device, an unsigned transaction; and means for receiving, from the host application, a coin seed associated with a cryptocurrency coin of the unsigned transaction. There is also provided means for generating a private key based on: the rood seed; and the coin seed. The data storage device also comprises: means for cryptographically signing the unsigned transaction with the private key to generate a signed transaction; and means for sending the signed transaction to the host device, wherein the private key has a corresponding public key in a cryptographic private-public key pair and the signed transaction is associated with a wallet address derived from the public key.

BRIEF DESCRIPTION OF DRAWINGS

FIG. 2 is a flow diagram of a method of securely signing a transaction with a hardware wallet in FIG. 1;

DESCRIPTION OF EMBODIMENTS

Overview

Figure 1:
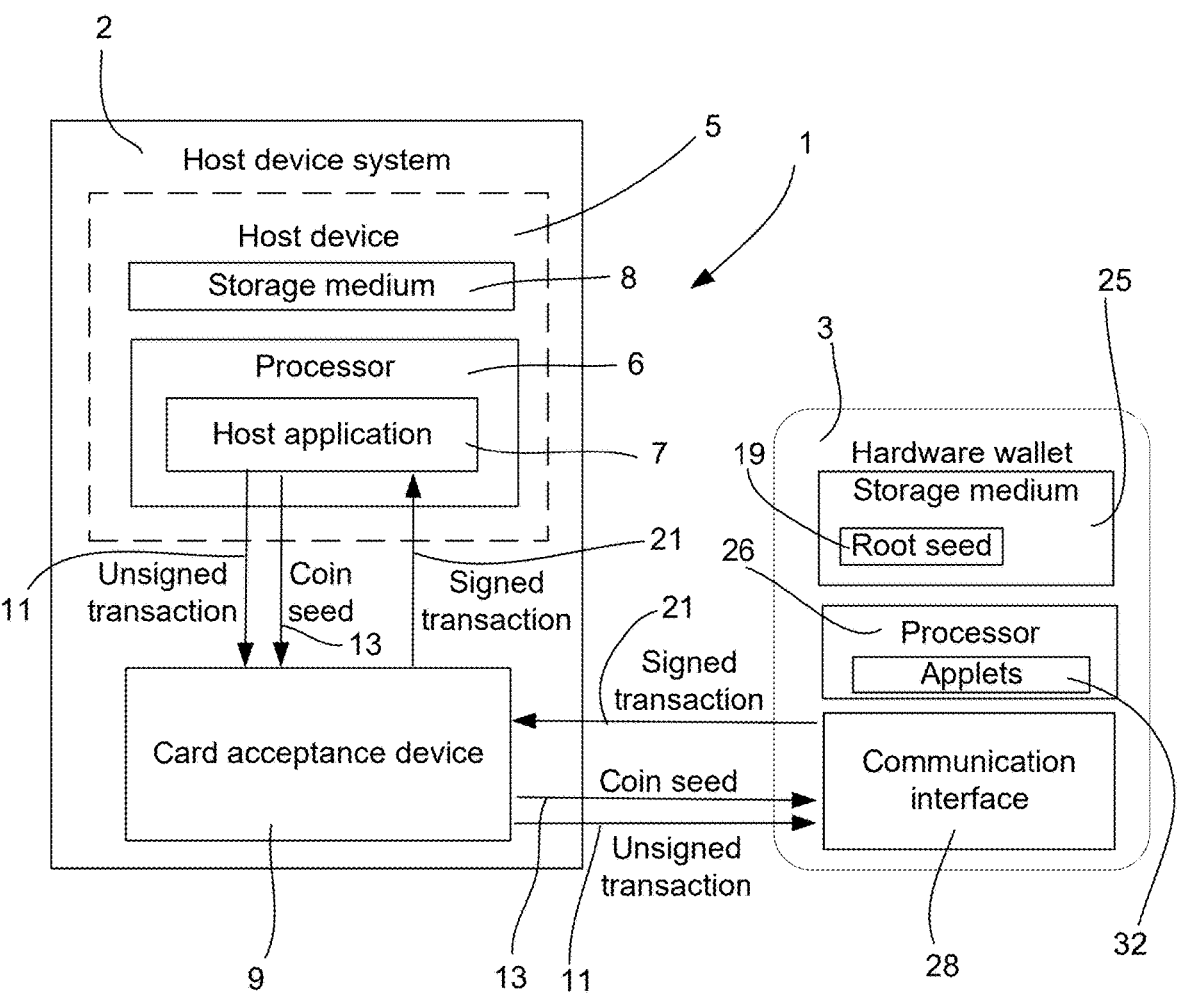
FIG. 1 is a schematic of a system including a host device with a hardware wallet.

A system 1, including a host device system 2 in communication with a hardware wallet 3, is illustrated in FIG. 1.

The host device system 2 includes a host device 5, such as laptop computer, desktop computer, tablet computer, mobile communication device, etc.

The host device 5 includes a storage medium 8 and one or more processors 6. A software application, such as host application 7, may operate at the processor(s) 6 to propose, receive, or otherwise facilitate transactions involving a cryptocurrency coin or other digital asset. The storage medium 8 can store other data related to a transaction, such as an unsigned transaction, a coin seed 13 associated with a cryptocurrency coin of the unsigned transaction 11, wallet addresses, etc. The host device 5 can be in communication, via a communications network (not shown), with a distributed ledger (not shown) with cryptographically enforced records of transactions.

The hardware wallet 3 is configured to securely sign transactions. The hardware wallet 3 includes a storage medium configured to store a root seed 19. The hardware wallet also includes one or more processors 26 configured, individually or in combination, to perform the method 100 described below. In some examples, the storage medium 25 and/or processor(s) 26 (or parts thereof) operate in a secure enclave such that the root seed 19, private keys 17, or other confidential information cannot be transmitted out of the hardware wallet 3 to the host device 5.

In this illustrated example, the hardware wallet 3 is in the form of a smart card. The hardware wallet 3 is in communication with the host device 5 via a card acceptance device 9. The card acceptance device 9 is associated with the host device 5 and can be in direct communication with the host device, or alternatively be part of the host device 5.

An example of a method 100 of securely signing a transaction will now be described with reference to FIG. 2. The host application 7 of the host device sends 211 an unsigned transaction 11 that is received at the processor(s) 26 of the hardware wallet 3. The host application 7 also sends 213 a coin seed 13 that is associated with the cryptocurrency coin of the unsigned transaction 11 that is also received 113 at the processor(s) 26.

The method 100 includes the processor(s) 26 generating 120, individually or in combination, a private key 17 based on the root seed 19, stored in the storage medium 25, and the coin seed 13 received from the host application 7. The private key 17 has a corresponding public key 27 in a cryptographic private-public key pair 23 and the transaction is associated with a wallet address 29 derived from the public key 27.

The unsigned transaction 11 is then cryptographically signed 130 with the generated private key 17 to generate a signed transaction 21. The method includes sending 140 the signed transaction 21 to the host device 5. On receiving 240 the signed transaction 240, the host application 7 in turn sends the signed transaction 240 to be recorded on the ledger (or to a device associated with another party to sign the transaction).

In this method, the private key 17 is only generated and applied within the hardware wallet 3. This enhances security as a host device 5 (that is potentially not secure) will not have direct access to the private key 17. Thus a user can have confidence that their private key is secure by physical custody of the hardware wallet (which can be selectively disconnected from the host device 5).

Furthermore, since the private key 17 that is generated is dependent on the coin seed 13 sent 213 from the host application 7, it is possible for the host application 7 to send an alternative coin seed corresponding to alternative cryptocurrency coin. Notably, the hardware wallet 3 can sign transactions related to that alternative cryptocurrency coin without having to update software or firmware at the hardware wallet 3, or to generate and store alternative private keys in the storage medium 25. This can enable the hardware wallet 3 to be used with an indefinite plurality of different cryptocurrency coin types whilst using the same root seed 19. In some examples, this may include a different cryptocurrency coin on a different blockchain. In other examples, the coin seed 13 may involve an additional or new cryptocurrency coin/token on an existing blockchain (such as an ERC-20 based token on the Ethereum blockchain).

Hardware Wallet

Referring to FIG. 1, the hardware wallet 3 includes a storage medium 25 and one or more processors 26. The processor(s) 26 may comprise one or more of microprocessors, microcontrollers, controlling circuitry, or a combination thereof. The one or more processor(s) 26 are, in combination or individually, configured to execute program code stored within the storage medium 25 to issue commands for controlling the operation of the hardware wallet 3. Although these are schematically illustrated as respective components, it is to be appreciated that these components (and communication interface 28) can be physically integrated in an assembly, such as a system on a chip (SoC).

In other examples, it can be appreciated that the function of these components are divided into multiple components. For example, there may be two or more distinct storage medium components where one storage medium component is enclaved to store sensitive data such as the root seed 19, whilst another storage medium component is provided to store less sensitive data such as temporarily storing the coin seed 13 or unsigned transaction 11. Similarly, the function of the processor(s) 26 may be implemented with a plurality of processors, and whereby processors may similarly be separated based on use and exposure to sensitive data.

The root seed 19 securely stored at the storage medium 25 enables future generation of private-public key pairs. Accordingly, the private-public key pairs 23 need not be persistently stored in the storage medium 25. This can enable the storage medium 25 to be configured with relatively smaller storage capacity (or alternatively configured with increased data retention) for the securely stored root seed 19.

It is to be appreciated that the storage medium 25, or an additional storage medium, can be configured to store software and/or firmware for the processor(s) 26. This can include non-transitory computer-readable medium to store instructions that are readable by the processor(s) 26 to perform the method 100.

In some examples, the hardware wallet 3 is a smart card for example, Satochip, Idemia's B.CHAIN, etc. This can include a Java Card enabled smart card utilizing the Java Card Open Platform (JCOP). The processor(s) may operate applications (Applets 32) to perform the method 100. That is, the method 100 includes a computer-implemented method that is executed on the processor(s) 26, in the form of a microcontroller unit (MCU) in the smartcard, based on applet program code.

The hardware wallet may also include a communication interface 28. In some examples, this can include a wireless communication module to communicate wirelessly (via an antenna) with a card acceptance device 9 in close proximity.

In other examples, the communication interface 28 may include communication via a physical connection with the card acceptance device 9.

Host Device

The host device 5 can be a computer system, computer, laptop, tablet, smartphone, etc. In some examples, the host device 5 can include other electronic devices that is configured to communicate with a distributed ledger network. For example, an automated teller to enable transactions of digital assets, a gaming console, a payment terminal, a point-of-sale device, a computer terminal, etc.

The host device 5 can be part of a host device system 2 that includes a connected card acceptance device 9. This can include a card acceptance device 9 as a peripheral to the host device 5. The host device 5 may communicate with the card acceptance device 9 via a wired communication means, such as a universal serial bus connection (USB), Thunderbolt, or other wired communication protocols. Alternatively, the communication means may be wireless such as via Bluetooth or Wi-Fi protocols.

In other examples, the card acceptance device 9 may be integrated into the host device 5. For example, the host device 5 may be a computer with a built-in card reader, or a point-of-sale terminal with a card reader.

The host device can include a storage medium 8 to store, persistently or temporarily, one or more coin seeds 13. The storage medium 8 may also store transactions (unsigned, or signed) as well as computer readable instructions (e.g. software) that implements the host application 7.

The host application 7 may perform the following functions:

a. Receive an unsigned proposed transaction from another node in a network. This can include receiving a proposed transaction from another node (corresponding to another party to the transaction).

b. Generate, or facilitate generation of, a proposed transaction;

c. Determine, or receive from another node, a coin seed related to the proposed transaction;

d. Send 211 the unsigned transaction 11 to the hardware wallet 3;

e. Send 213 the coin seed 13 to the hardware wallet;

f. Send 210 a request 41 to sign the unsigned transaction 11 to the hardware wallet that includes both the unsigned transaction 11 and the coin seed 13;

g. Receive 240 the signed transaction 21 from the hardware wallet 3;

h. Send the signed transaction 21 to a distributed ledger;

i. Facilitate initialization of the hardware wallet. This can include generating, or facilitating generation of, the root seed 19.

Card Acceptance Device 9

The card acceptance device 9, as discussed above, functionally enables communication between the host device 5 and hardware wallet 3. More specifically, in some examples, between the host application 7 and the applet 32 performing the method 100.

As noted above, the host device 5 may be in wireless, or wired, communication with the card acceptance device 9. The card acceptance device 9 may, in turn communicate wirelessly or via physically connection with the communication interface 28 of the hardware wallet 3.

Thus the steps of sending and receiving unsigned transactions 11, coin seeds 13, and signed transaction 21 is performed by sending to and from the card acceptance device 9.

Method

The method of initializing a hardware wallet with a root seed will now be described followed by a process of signing a transaction with the hardware wallet.

Initialization and Generation of Root Seed and Storing in Hardware Wallet

A root seed 19 needs to be generated to be stored in the hardware wallet 3. In some examples, the root seed 19, or the precursor mnemonic phrase 53, is generated with the applets 32 at the hardware wallet 3.

The root seed 19 consists of random characters or hexadecimal codes which are hard to remember or to transcribe. To mitigate this issue, mnemonics (recovery words) provide a human-readable representation of the root seed 19 used to generate the private and public keys 17, 27. Mnemonics can be randomly generated for a user during first set up of the crypto hardware device, and in turn these recovery words generate the root seed. As a backup, a user can write these recovery words on paper (or any other personal and secure place) to allow a user to recover your wallet details in the future in case the hardware wallet 3 is lost or damaged.

Figure 4:
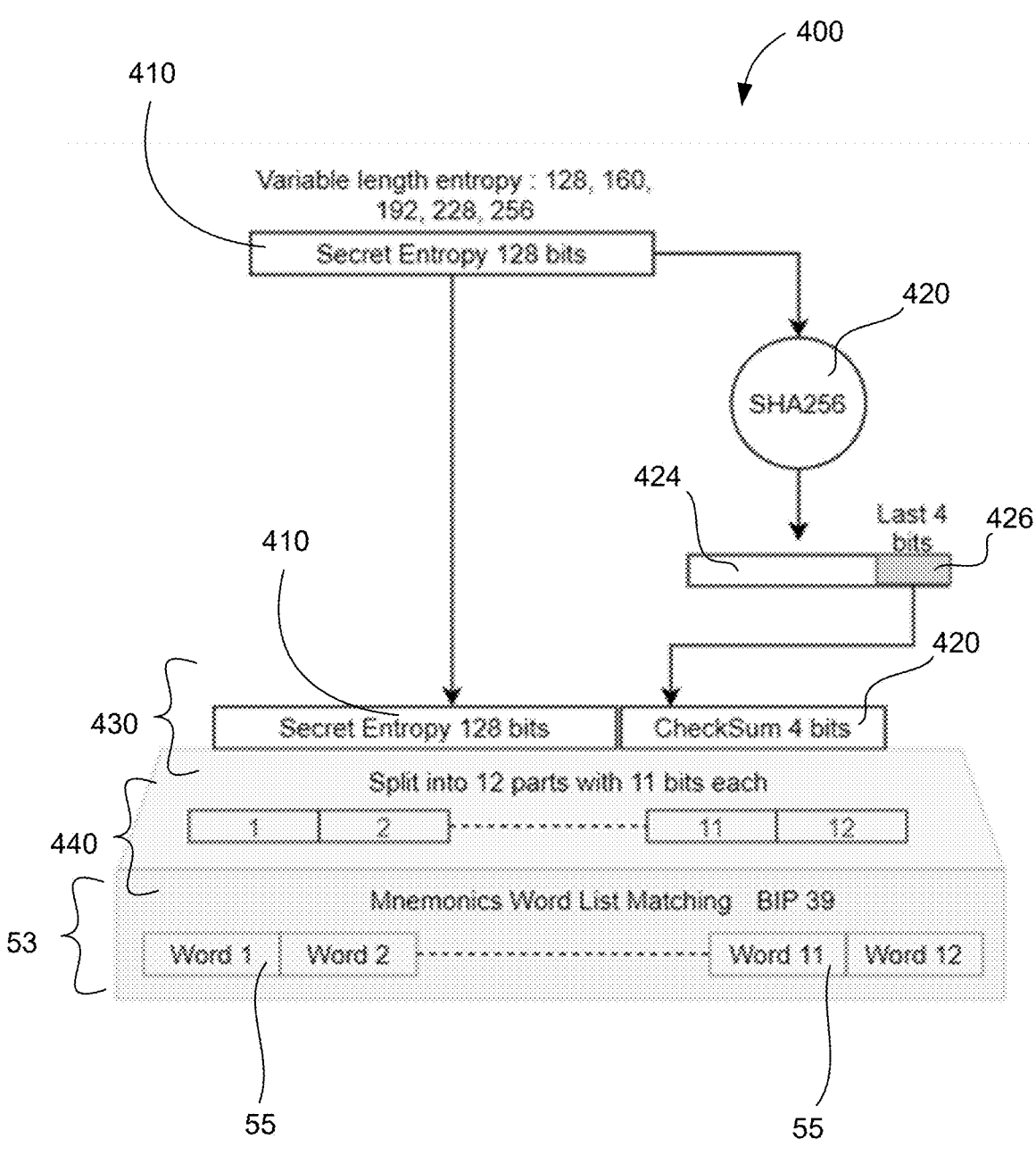
FIG. 4 is a diagram of randomly generating a mnemonic phrase.

Referring to FIG. 4, architectural and generation flow 400 starts from generating the 12-word mnemonics phrase 53 (including recovery mnemonic words 55) using BIP 39 standards (bitcoin improvement proposal 39). At first, a secret entropy 410 of 128 bits (16 bytes) is randomly generated. Next, using 420 SHA256 (Secure Hash Algorithm 256) to generate an output 424 of the secret entropy, in particular last 4 bits (least significant bits, LSB) checksum 426, making the aggregate output 430 comprising 132 bits. Now, these 132 bits of the aggregate output 430 are split 440 into 12 parts of 11 bits each. These 12 parts are converted into mnemonics using BIP39 standard mnemonics word list. Hence, we get 12-word mnemonics phrase 53 comprising a plurality (of 12) recovery mnemonic words 55.

Figure 6:
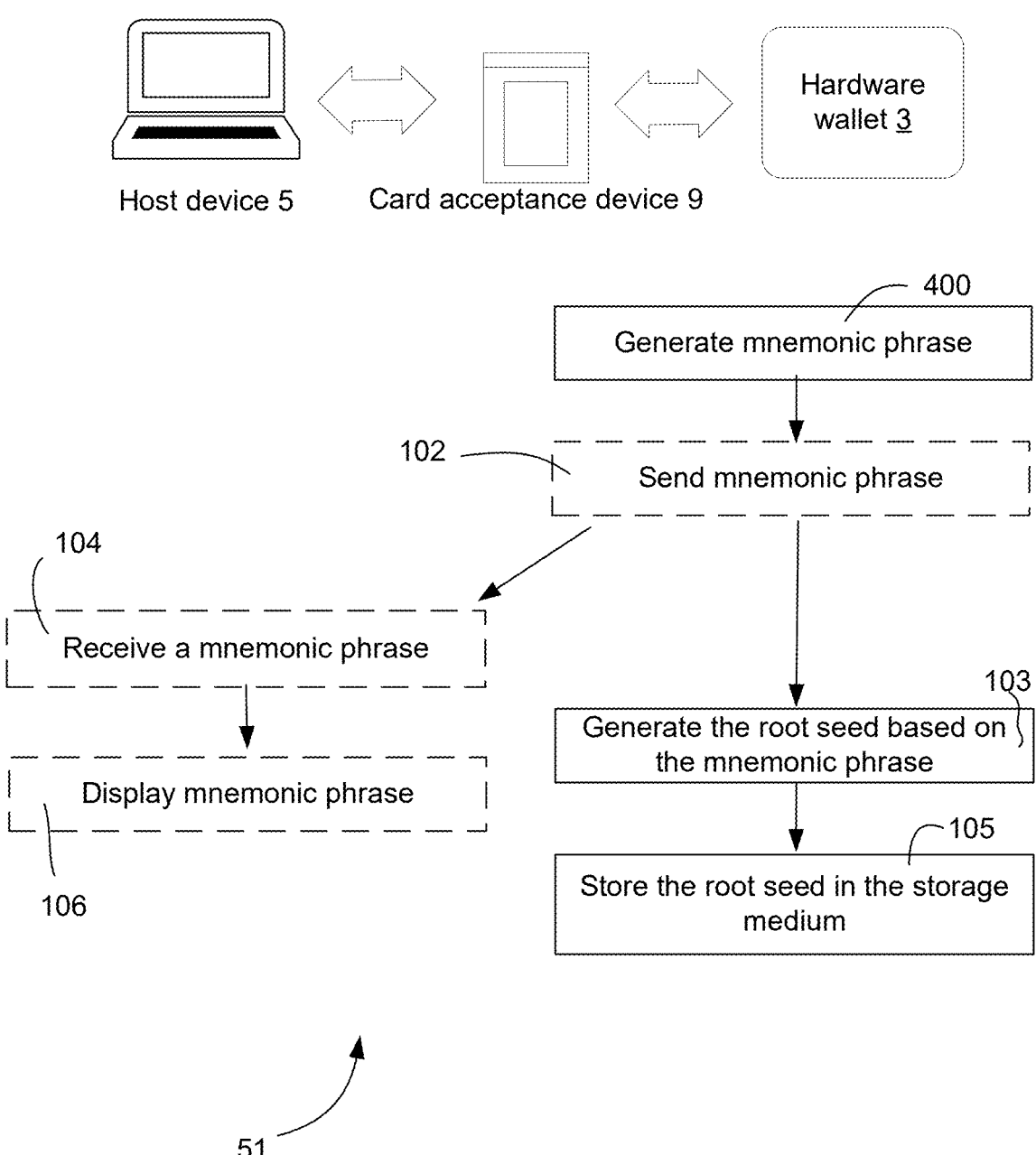
FIG. 6 is a flow diagram of a method of initialization to generate the root seed.

In some examples, as illustrated in the initialization mode 51 in FIG. 6, the mnemonic phrase 53 is then generated 400 at the hardware wallet 3. The processor(s) 26 at the hardware wallet 3 generates 103, individually or in combination, the root seed 19 based on the mnemonic phrase 53 (also known as mnemonic sentence).

The mnemonic phrase may be optionally sent 102 to the host device 5, whereby on receiving 104 the mnemonic phrase, the mnemonic phrase is displayed 106 at a user interface of the host device 5. This enables a user to write down the mnemonic phrase as a recovery phrase in case the hardware wallet 3 is lost or damaged.

Figure 5:
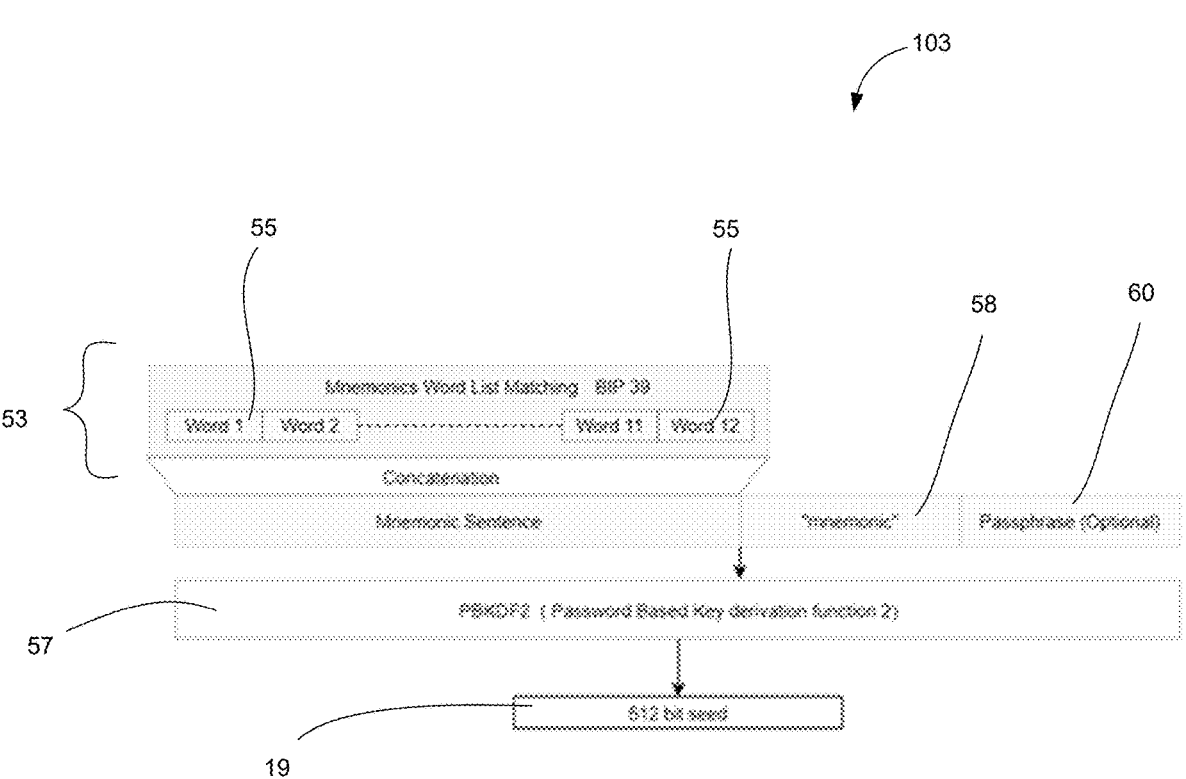
FIG. 5 is a diagram of generating a root seed from the mnemonic phrase.

An example process of generating the root seed 19 is illustrated in FIG. 5. This can include passing the mnemonic phrase 53 to a password based key derivation function 57 (such as PBKDF2—Password Based Key Derivation Function 2) along with "mnemonic" word byte array 58 and an optional passphrase 60. This results in a 512 bits (64 bytes) hierarchical deterministic (HD) root seed 19 which is further used to generate the private public key pairs 23 for different crypto coins. It is possible to regenerate this root seed 19 using 12-word mnemonics in case the hardware wallet 3 is lost or damaged.

Referring to FIG. 6, after determining the root seed 19, this is securely stored 105 in the storage medium 25 of the hardware wallet 3.

Figure 7:
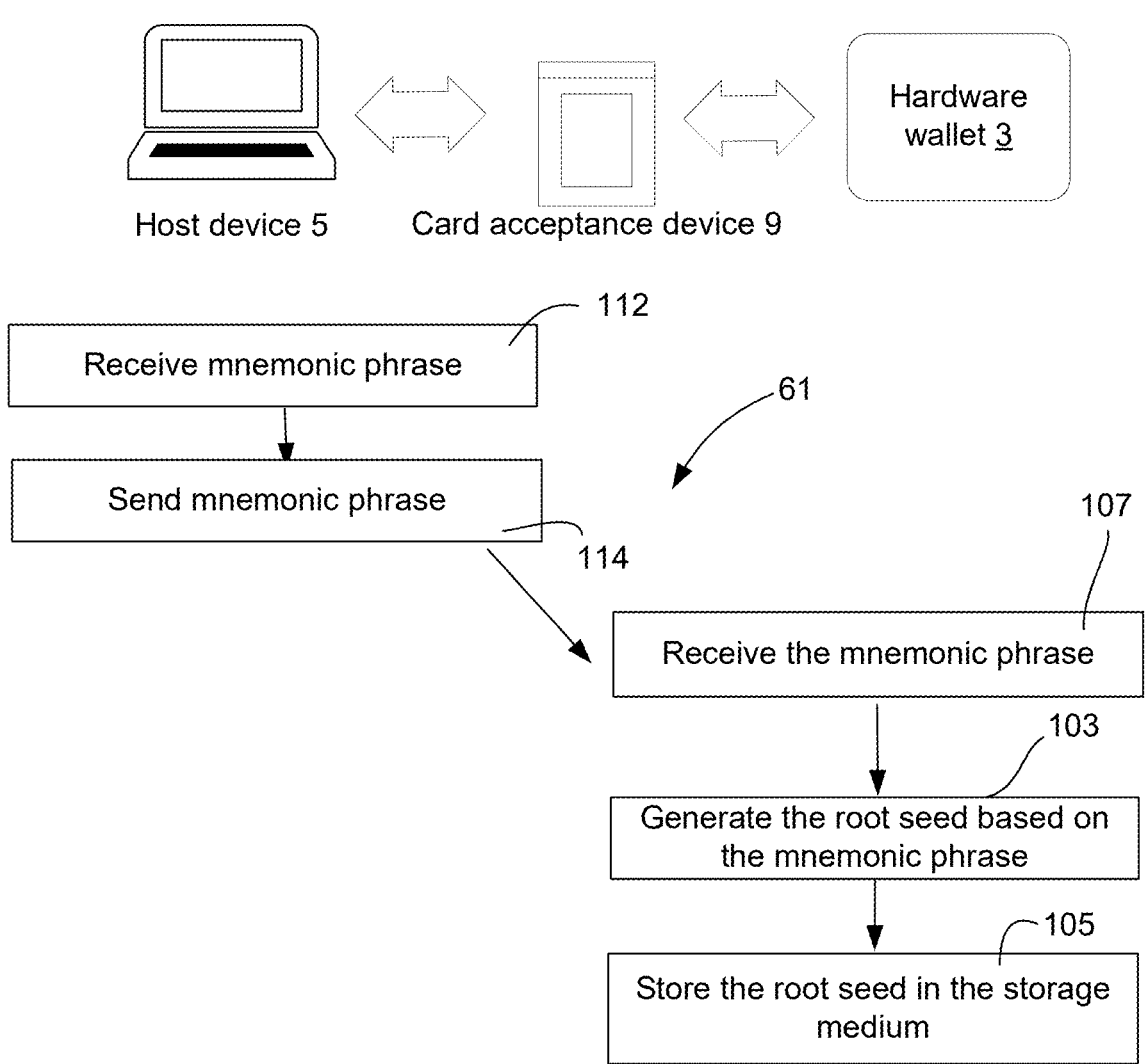
FIG. 7 is a flow diagram of another method of initialization by receiving a mnemonic phrase.

FIG. 7 illustrates an alternative second initialization mode 61. This second mode, which can be considered a recovery mode, is when an existing mnemonic phrase 55 is used to regenerate the rood seed (19). Situations where this is desirable is when an existing hardware wallet is lost or stolen. To that end, a user can provide the mnemonic phrase 55 to be received 112 at a user interface associated with the host device 5. The host device 5 in turn sends 114 the mnemonic phrase 55 that is then received 107 at the replacement hardware wallet 3. The root seed is then generated 103 based on the mnemonic phrase 55. The hardware wallet then securely stores 105 the root seed 19 in the storage medium. The user can then use initialized replacement hardware wallet 3, equipped with the regenerated root seed, similar to the original hardware wallet 3.

Generation of Private Key, Public Key, and Wallet Address

The root seed 19 can, in turn, be selectively used to generate private-public key pairs 23. These private-public key pairs can vary based on the specific cryptocurrency coin required for the wallet/transaction by additional seeding with a coin seed 13.

Figure 3:
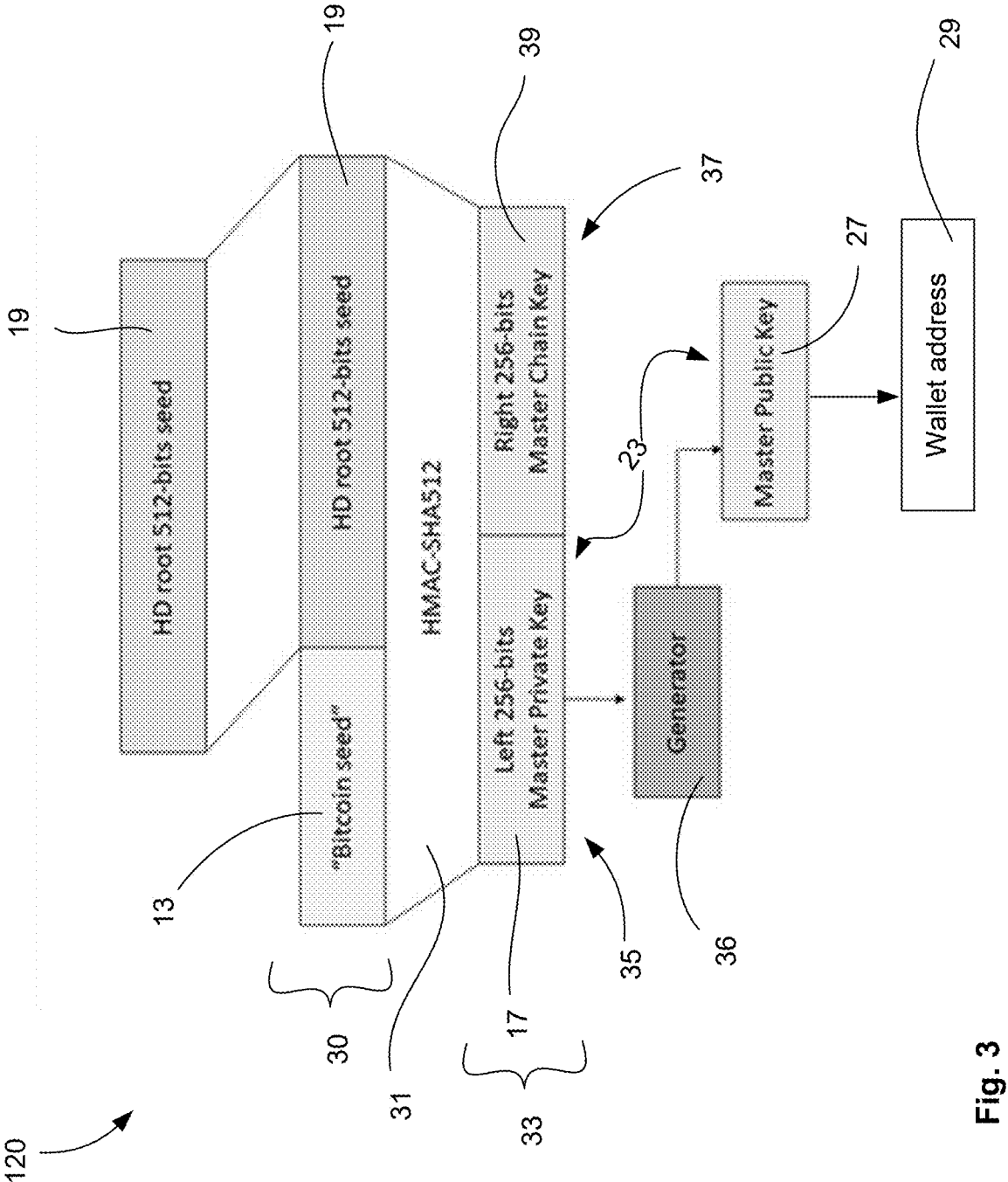
FIG. 3 is a diagram of generating a private key, public key, and wallet address based on a root seed and a coin seed.

FIG. 3 illustrates generation 120 of a private key 17 along with the associated public key 27 in the private-public key pair 23, and a wallet address 29.

A coin seed 13 for the selected cryptocurrency coin, such as "Bitcoin seed" in FIG. 3, is appended or prepended with the 512-bits master HD root seed 19. A first cryptographic hash function 31 is then applied to this combination of coin seed 13 and root seed 19. In some examples, this cryptographic hash function 31 is a HMAC-SHA512 function (Hash-based message authentication code, secure hash algorithm).

The cryptographic output 33 of the cryptographic hash function 31 in this example is a 512-bits (64 bytes) array. A first portion 35 of the cryptographic output 33 (the left 256 bits in the example of FIG. 3) form the private key 17. A second portion 37 of the cryptographic output 33 (the right 256 bits) form a chain key 39 (also known as chain code). The left 256 bits, being the private key 17, are used to generate 36 the public key 27 and this public key 27 is used to obtain the wallet address 29 to receive the funds/cryptocurrency coins.

The public key 27 and the wallet address 29 are typically required by other parties (and their respective devices) to form a transaction. This data can be "public" data in that they can be shared with other parties without compromising the security of the private key 17.

In some examples, the public key 27 and wallet address 29 are determined at the hardware wallet side and selectively sent to the host application 7 to enable generation of the proposed transactions and/or to query account/wallet balances.

In some examples, to receive funds in a transaction the requirement may only be to provide the public key 27 (and/or the wallet address). That is, generating the public key 27 and sharing the public key 27 with the sender of the funds.

The process of signing a transaction, in some examples, is only required when the user wants to send funds/cryptocurrency from their wallet to another person. However in further examples, it is to be appreciated more complex transactions involving multiple parties, or multiple currency flows, may require additional signatures before recording to the ledger.

Process of Signing a Transaction

To perform a transaction, an unsigned transaction 11 needs to be proposed or otherwise formed. This can include the host application 7 forming, at least in part, the proposed transaction and this can include providing or incorporating details of the wallet address 29 for the parties to the transactions and the respective public keys 27 of the parties.

Such data, as well as the proposed transaction, may be communicated to and from other parties via a communication network (not shown).

Once the parties, in particular the user of the host device 5 and hardware wallet 3, are satisfied with the proposed unsigned transaction 11, the unsigned transaction 11 is sent to the hardware wallet 3 for signing.

In some examples, the unsigned transaction 11 may be sent together with the coin seed 13 in a single request 41 (as illustrated in FIG. 2). This may increase reliability as there the hardware wallet 3 is provided with a coin seed 13 contemporaneously such that the private key 17 can be generated dynamically for signing the current transaction. That is, there will not be uncertainty on whether the coin seed 13 at the hardware wallet 3 is the appropriate for the present transaction (as opposed to a coin seed for earlier transactions).

Dynamic Generation of Private Key

To enable the hardware wallet to sign the transaction 11 with the appropriate private key 17 (i.e. with a private key 17 that correspond to the particular user, and for the particular cryptocurrency coin), this private key must be generated.

As the private key 17 is not (or need not be) persistently stored on the hardware wallet 3, the private key 17 is dynamically generated whenever the private key (or public key or wallet address) are required by the user.

To enable this dynamic generation, this is dependent on the hardware wallet 3 receiving 113 the appropriate coin seed 13 that corresponds to at least one cryptocurrency coin of the transaction 11.

In some examples, the coin seed 13 is coin specific. That is, there can be a coin seed for Bitcoin, another coin seed for Ethereum, and another coin seed for XRP. The coin seed can be pre-defined for each type of cryptocurrency. This may include coin seeds specific for a cryptocurrency coin/token on another blockchain (such as ERC-20 tokens on the Ethereum blockchain). In further examples, these pre-defined coin seeds 13 is public data.

In some examples, the coin seed 13 is sent 213 from the host application 7 to the hardware wallet 3 in hexadecimal format. This may be useful in examples where the hardware wallet 3 is a smart card where the APDU (application protocol data unit) enabling communication operates more efficiently with hexadecimal values. The coin seed 13 passes through the card acceptance device 9 and to the processor(s) 26 of the Java card hardware wallet 3. The applet 32 containing the code base then generates 120 the private-public pair 23 using the received coin seed 13, the persistently stored root seed 19 in the storage medium 25 and the process described above with reference to FIG. 3

Cryptographic Signing of a Transaction

After generation 120 of the private key 17, the hardware wallet 3 can then cryptographically sign 130 the transaction 11 using the private key 17.

In some examples, the hardware wallet 3 may require further authorization before applying the cryptographic signature to prevent an unauthorized user in possession of the hardware wallet 3 from using the hardware wallet 3. This may include proving a PIN (personal identification number) or password from a user interface of the host device 5 that is then, in turn, sent to the hardware wallet 3 to authenticate the user.

The method of cryptographic signing 130 may depend on the type of cryptocurrency coin or transaction. Examples of digital signing algorithms include:
- a. ECDSA (Elliptic Curve Digital Signature Algorithm)
- b. Schnorr
- c. BLS (Boneh-Lynn-Schacham)

After signing, the signed transaction 21 is then sent 140 to the host device 5. This can include sending via the card acceptance device 9. To record the signed transaction 21, the host device 5 may send the transaction to a distributed ledger, such as a blockchain.

Advantages

A crypto hardware wallet can keep digital assets safe even if the computer used to make the transaction is not secure. This is enabled by saving crucial information like private keys and root seeds on chip secure enclave (such as the processor(s) 26, and storage medium 25).

There are many crypto-coins (or other digital assets) available in the market and each crypto-coin, and for each user, has its own respective private-public key pair. If each of these private-public key pairs are stored at a hardware wallet, then this increases the on-chip flash storage requirements. Thus examples of known crypto hardware wallets require large on chip storage (e.g. running into 2-4 Megabytes or more) for supporting multiple crypto coins and chains. This storage requirements increases the device cost, and the device becomes expensive as the storage capacity increase.

The presently disclosed hardware wallet 3 and method can advantageously reduce the requirement to have large storage requirements to store each crypto key pair. Instead of storing the private and public keys of each coin used by the user, the disclosed hardware wallet 3 can support multiple cryptocurrency coins without requiring additional on-chip storage for each additional coin. This is achieved by leveraging hierarchical deterministic key generation through a root seed persistently stored on hardware wallet. This is combined with dynamically receiving the coin seed 13 from the host device 5 when a transaction (or other operation) involving the specific cryptocurrency coin is required. Since support for additional coins is based on receiving an additional respective coin seed 13, the hardware wallet can support additional currencies (including new currencies) without having to install new application on the hardware wallet nor storing new private keys in the hardware wallet.

This can be advantageous when a new cryptocurrency is released, as it is possible for the hardware wallet 3 to support that cryptocurrency without updating the firmware on the hardware wallet.

The disclosed method and hardware wallet 3 may also be advantageous for users that transact or hold multiple types of cryptocurrency (or other digital asset). For example, in some existing hardware wallets with limited storage, a user may need to delete coin applications from a hardware wallet to make room to store and run an alternative coin application. In contrast, in examples of the present disclosure the firmware on the hardware wallet 3 may be agnostic to the type of coin, and the requirement is to operate is to receive the coin seed 13 (from the host side) to reliable and consistently generate the private/public key pair. When the user wishes to transact in another currency, an alternative coin seed 13 is received from the host side to generate keys for that other coin.

Since the disclosed method and hardware wallet has a relatively smaller resource requirement (in particular storage requirements) compared to existing solutions this enables implementation using modified or adapted forms of known smart card technologies. Some examples of the present disclosure include using Java Card Open Platform (JCOP) to enable the disclosed method 100. By using Java card, this can enable a cost-effective implementation of the hardware wallet 3.

Variations

In the above examples, the root seed or the precursor mnemonic phrase is generated at the hardware wallet 3, such as by applet 32. However, in some alternative examples the root seed or the precursor mnemonic phrase could be generated at the host application 7 and subsequently sent to the hardware wallet 3 to be stored in the storage medium 25.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of securely signing a transaction at a hardware wallet, the method comprising:

receiving, from a host application of a host device, a request to sign an unsigned transaction, wherein the request comprises the unsigned transaction and a coin seed associated with a cryptocurrency coin of the unsigned transaction;

generating, at the hardware wallet and responsive to receiving the coin seed, a private key based on:

a root seed stored in a storage medium of the hardware wallet; and the coin seed;

cryptographically signing the unsigned transaction with the private key to generate a signed transaction; and sending the signed transaction to the host device, wherein:

the private key has a corresponding public key in a cryptographic private-public key pair; and the signed transaction is associated with a wallet address derived from the public key.

2. The method according to claim 1, wherein generating the private key comprises hierarchical deterministic key generation based on a first cryptographic hash function applied to the coin seed appended, or prepended, with the root seed.

3. The method according to claim 2, wherein a cryptographic output of the first cryptographic hash function includes:

a first portion to form the private key; and a second portion to form a chain key.

4. The method according to claim 1, further comprising receiving, from the host application of the host device, a second request for a second unsigned transaction, wherein the second request comprises the second unsigned transaction and an alternative coin seed associated with a different cryptocurrency coin for the second unsigned transaction; and generating, at the hardware wallet and responsive to the alternative coin seed, a second private key based on the root seed and the alternative coin seed.

5. The method according to claim 1, wherein the coin seed received in the request to sign the unsigned transaction is in hexadecimal format.

6. The method according to claim 1, further comprising, in an initialization mode:

generating a mnemonic phrase comprising a plurality of mnemonic words;

generating the root seed based on the mnemonic phrase; and storing the root seed in the storage medium.

7. The method according to claim 6, wherein the step of generating the root seed is based on a password based key derivation function applied to the plurality of mnemonic words in the mnemonic phrase.

8. The method according to claim 1, further comprising, in an initialization mode:

receiving, from the host device, a mnemonic phrase to generate the root seed;

generating the root seed based on the mnemonic phrase; and storing the root seed in the storage medium.

9. The method according to claim 1, wherein:

receiving the request to sign the unsigned transaction comprises receiving the unsigned transaction from a card acceptance device associated with the host device; and sending the signed transaction comprises sending the signed transaction to the card acceptance device associated with the host device.

10. The method according to claim 1, wherein the hardware wallet comprises a Java Card enabled smart card configured to operate a Java-based application to perform the method.

11. A hardware wallet comprising:

a storage medium configured to store a root seed;

one or more processors configured, individually or in combination, to:

receive, from a host application of a host device, a request to sign an unsigned transaction, wherein the request comprises the unsigned transaction and a coin seed associated with a cryptocurrency coin of the unsigned transaction;

generate, responsive to receiving the coin seed, a private key based on:

the root seed; and the coin seed;

cryptographically sign the unsigned transaction with the private key to generate a signed transaction; and send the signed transaction to the host device, wherein:

the private key has a corresponding public key in a cryptographic private-public key pair; and the signed transaction is associated with a wallet address derived from the public key.

12. The hardware wallet according to claim 11, wherein the one or more processors are further configured, individually or in combination, to generate the private key with hierarchical deterministic key generation based on a first cryptographic hash function applied to the coin seed appended, or prepended, with the root seed.

13. The hardware wallet according to claim 12, wherein the one or more processors are further configured, individually or in combination, to generate a cryptographic output of the first cryptographic hash function that includes:

a first portion to form the private key; and a second portion to form a chain key.

14. The hardware wallet according to claim 11, wherein the one or more processors are further configured, individually or in combination, to;

receive, from the host application of the host device, a second request for a second unsigned transaction, wherein the second request comprises the second unsigned transaction and an alternative coin seed associated with a different cryptocurrency coin for the second unsigned transaction; and generate, responsive to the alternative coin seed, a second private key based on the root seed and the alternative coin seed.

15. The hardware wallet according to claim 11, wherein, in an initialization mode, the one or more processors are further configured, individually or in combination, to:

generate a mnemonic phrase comprising a plurality of mnemonic words;

generate the root seed based on the mnemonic phrase; and store the root seed in the storage medium.

16. The hardware wallet according to claim 15, wherein the one or more processors are further configured, individually or in combination, to generate the root seed based on a password based key derivation function applied to the plurality of mnemonic words in the mnemonic phrase.

17. The hardware wallet according to claim 11, wherein, in an initialization mode, the one or more processors are further configured, individually or in combination, to:

receive, from the host device, a mnemonic phrase to generate the root seed;

generate the root seed based on the mnemonic phrase; and store the root seed in the storage medium.

18. The hardware wallet according to claim 11, further comprising:

a communication interface configured to communicate with a card acceptance device associated with the host device, wherein the one or more processors are further configured, individually or in combination, to:

receive the unsigned transaction via the communication interface and the card acceptance device; and send the signed transaction via the communication interface and the card acceptance device.

19. The hardware wallet according to claim 11, further comprising:

a Java Card enabled smart card configured to operate a Java-based application using the one or more processors.

20. A data storage device comprising:

means for storing data to store a root seed;

means for receiving, from a host application of a host device, a request to sign an unsigned transaction, wherein the request comprises the unsigned transaction and a coin seed associated with a cryptocurrency coin of the unsigned transaction;

means for generating, responsive to receiving the coin seed, a private key based on:

the root seed; and the coin seed;

means for cryptographically signing the unsigned transaction with the private key to generate a signed transaction; and means for sending the signed transaction to the host device, wherein the private key has a corresponding public key in a cryptographic private-public key pair and the signed transaction is associated with a wallet address derived from the public key.

\* \* \* \* \*